United States Patent [19]

Garner

[11] Patent Number: 4,710,114
[45] Date of Patent: Dec. 1, 1987

[54] APPARATUS FOR INSULATING AN ELECTRICAL CONDUCTOR

[75] Inventor: John N. Garner, Kingston, Canada
[73] Assignee: Northern Telecom Limited, Montreal, Canada
[21] Appl. No.: 853,593
[22] Filed: Apr. 18, 1986
[51] Int. Cl.[4] .................... B29C 47/02; B29C 47/12
[52] U.S. Cl. .................... 425/110; 264/174; 425/113; 425/114; 425/141; 425/465; 425/466
[58] Field of Search .............. 425/110, 192, 113, 141, 425/145, 146, 172, 174.2, 174.4, 174.6, 465, 466, 114

[56] References Cited

U.S. PATENT DOCUMENTS 3,402,427  9/1968  Christofas et al. .................. 425/113
4,551,087  11/1985  Pan et al. ............................ 425/466
4,605,525  8/1986  Baxter .................................. 425/141

Primary Examiner—Jay H. Woo
Assistant Examiner—Timothy W. Heitbrink
Attorney, Agent, or Firm—R. J. Austin

[57] ABSTRACT

Apparatus for forming an insulation layer around an electrical conductor and having a die insert or core tube for guiding the conductor through a die orifice. The insert is movable to control its position and its position is controlled by two rotatable mountings. A first of the mountings eccentrically holds and is rotatable around the insert while the second mounting lies radially outside of and eccentrically holds the first mounting. A monitoring means analyzes degree of eccentricity of the conductor and operates a driving means for the mountings to move the insert in the appropriate direction for concentricity.

5 Claims, 3 Drawing Figures

APPARATUS FOR INSULATING AN ELECTRICAL CONDUCTOR

This invention relates to apparatus for insulating electrical conductors.

In the provision of an insulating layer upon an electrical conductor wire (referred to herein as "electrical conductor"), it is conventional practice to feed the conductor through a die orifice to surround it with elastomeric dielectric extrudate.

The problem with coating a conductor in this manner is that it is extremely difficult to locate and hold the conductor concentrically disposed within the extrudate during the coating procedure. Known conductor position adjustment apparatus is not sufficiently sensitive in operation to provide a substantially continuous concentricity of conductor and extrudate, particularly as in the case of conductor insulation, the insulation is extremely thin, e.g. around 7 mils for 22 or 24 AWG conductor. This thickness allows for a tolerance only of the order of 0.0001 inches.

In the manufacture of cable cores, various means are known for providing substantial concentricity of a core within a jacket material during extrusion. In such apparatus, it is known to pass the core through a die insert upstream from the die orifice. To provide substantial concentricity, die inserts are movable laterally of their die orifices so as to move their cores radially for adjustment purposes. Apparatus operating in this manner is described in U.S. Pat. No. 4,551,087, granted Nov. 5, 1985 (Canadian equivalent No. 445,949, filed June 6, 1984) and entitled "Extrusion Apparatus" in the names of A. Pan and K. S. Cohrs. Such apparatus is suitable for providing substantial concentricity of a core within a jacket, because the degree of tolerance may be of the order of 0.005 inches for a thickness of around 40 mils.

However, the differences in diameter between the jacket and a conductor insulation layer is such that the apparatus referred to in the copending application while being suitable for providing concentricity of a core, is too coarse in operation for controlling concentricity of a conductor within a relatively small thickness insulation layer.

The present invention is concerned with apparatus for forming an insulation layer upon an electrical conductor in the use of which substantial concentricity of the conductor within the layer is achieved.

According to the present invention apparatus is provided for forming an insulation layer around an electrical conductor comprising an extruder head having a die orifice, a die insert mounted for universal movement within the head, the insert having an outlet orifice for passage of the conductor along a passline towards the die orifice, and position control means to controllably position the insert within the head, said position control means comprising a first rotatable mounting eccentrically holding the die insert said first rotatable mounting being rotatable about the die insert and a second rotatable mounting radially outside of and eccentrically holding the first rotatable mounting, a driving means for rotatably turning each mounting, and means for monitoring and analyzing degree of eccentricity of the conductor and the insulation layer downstream from the extruder head and for issuing control signals dependent upon the degree of eccentricity, the driving means responsive to the control signals to selectively rotate the mountings and universally move the insert in an appropriate direction to lessen the degree of eccentricity of the conductor and the insulation layer.

In a preferred arrangement, the first and second mountings are, respectively, first and second tubes each having a bore which is eccentric relative to an outer surface of the tube. In this preferred arrangement, the second tube surrounds and rotatably carries the first tube and the second tube is rotatably mounted in the head. It is also preferable for an annular support element to concentrically surround the die insert with the first tube rotatable around the support element, the support element having an annular inwardly projecting rib formed with a peak which provides an annular line contact with the die insert.

One embodiment of the invention will now be described, by way of example, with reference to the accompanying drawings, in which.

Figure 1:
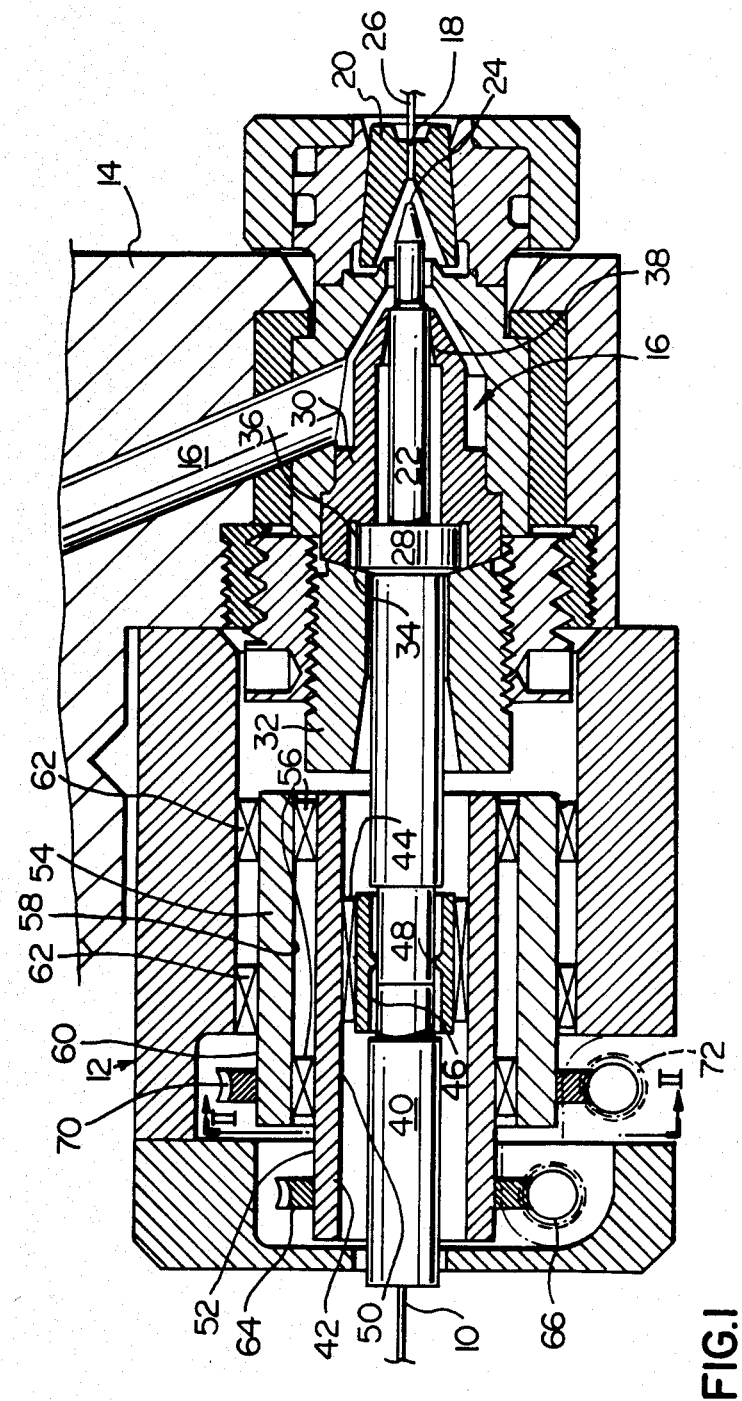
FIG. 1 is a cross-sectional view in side elevation through an extruder head.

As shown in FIG. 1, apparatus for providing an insulation layer of plastics material (e.g. either PVC or polyethylene) around a telecommunications electrical conductor 10 comprises an extruder head 12 secured in conventional fashion to an extruder 14. The extruder head is formed with flow passes 16 for connecting the extruder with a die orifice 18 formed by die plates 20 attached to the outside of the head in conventional fashion.

Disposed within the head is a die insert 22. The die insert is for guiding the conductor 10 through the head and has an outlet orifice 24 for passage of the conductor along a passline towards the die orifice. The die insert is mounted for universal movement within the head, as will now be described, for the purpose of adjusting the position of its outlet orifice relative to the die orifice 18 in any radial direction to enable the conductor position to be adjusted within the insulation layer as this is being formed in order to provide the insulated conductor 26 (right-hand side of FIG. 1). Upstream from the outlet orifice 24 is located a seat for the insert 22. This seat is produced by an annular convex surface 38 of the head sleeve 30. The surface 38 engages a cylindrical portion of the insert around an annular line of contact so as to enable the insert to move universally through very small angles upon the surface 38. The insert 22 and the surface 38 distort very slightly to accommodate the movement. The insert is held axially in position, while being universally movable, by a holding means further upstream. The holding means comprises an enlarged collar 28 which is held between the head sleeve 30 through which the forward end of the insert extends, and a locking nut 32. As may be seen from FIG. 1, the collar 28, the head sleeve 30 and the nut 32 have complementary and opposing part spherical seating surfaces 34. The head sleeve 30 provides a clearance 36 around the collar which allows for the collar to move in any radial direction so as to produce upon the seating surfaces 34 a universal movement of the insert relative to the head.

An extension 40 of the insert extends upstream from the collar 28, the extension passing with clearance through the nut 32 so as to allow for universal movement of the insert.

A position control means is included for controllably positioning the insert 22 within the head so as to locate the orifice 24 at any desired position with the object of centralizing the conductor inside the insulation layer. The position control means comprises first and second rotatable mountings. The first rotatable mounting comprises a first tube 42 which surrounds an upstream end of the extension 40 of the die insert and is rotatable thereon by a bearing 44 which surrounds an annular support element 46 concentrically carried upon the extension 40. The support element has an annular inwardly projecting rib 48 which is formed with a peak to provide an annular line contact with the die insert so as to allow for any slight angular change between the axis of the support and the die insert during universal movement of the insert. The first or inner tube 42 has a bore 50 which is eccentrically disposed in relation to its outer surface 52. The tube 42 is surrounded by a second or outer tube 54 which provides the second rotatable mounting. The second tube is carried by bearings 56 upon the inner tube. The inner surface 58 of the second tube is also eccentrically disposed relative to the outer surface 60. The second tube is rotatably held within the head by bearings 62. The position control means also comprises a driving means for each mounting. The driving means for the first tube 42 comprises a worm and wheel gear arrangement consisting of a wheel 64 which is mounted adjacent the upstream end of the tube 42, and a worm 66. The worm is driven by an electric stepper motor 68 (see FIG. 3). Similarly, the tube 54 is drivable by a worm and wheel arrangement comprising a wheel 70 and worm 72. The worm 72 is drivable by an electric stepper motor 74 (see FIG. 3).

Figure 2:
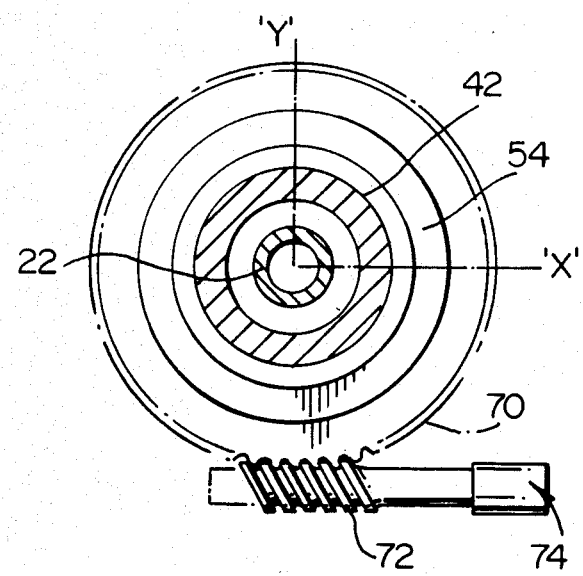
FIG. 2 is a cross-sectional view through the extruder head taken along the line II—II in FIG. 1.

As may be seen from the above description, rotation of the outer tube 54 by means of the gear arrangement 70, 72 will produce a rotation of the axis of the tube inner surface 58 around the axis of the outer surface 60. This rotational movement of the axis is immediately translated into a universal movement of the die insert 22 within the surface 38 of the head sleeve 30 and with the insert held axially in position within the head by the collar 28. In addition, the rotation of the tube 42 with the tube 54 remaining stationary will cause the axis of the inner surface 50 to rotate around the axis of the outer surface 52. It follows from this that if both of the tubes are rotated simultaneously and in a preset manner, then the insert may be caused to pivotally move in a controlled and universal fashion so as to move the die orifice in any desired direction and to any desired position relative to the 'X' and 'Y' axes (FIG. 2). Because of the closeness of the outlet orifice 24 to the universal pivoting position between the surface 38 and the insert 22 and the substantially greater distance from the universal pivoting position to the rib 48 then any degree of controlled movement of the insert at the rib is translated into a correspondingly smaller degree of movement at orifice 24. Thus a very fine adjustment in the position of the orifice 24 is made possible using this apparatus so that an infinitely fine degree of control is provided upon the location of the conductor within the insulation in the insulated conductor 26.

Figure 3:
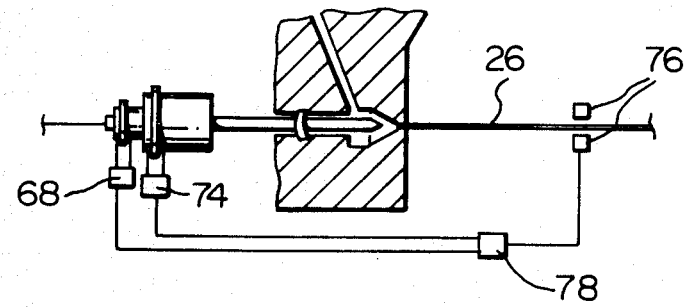
FIG. 3 is a diagrammatic side elevational view, on a smaller scale in FIG. 1, showing the extruder head with a position control means for a die insert within the head.

In use of the apparatus shown in FIGS. 1 and 2, the extruder head is disposed in a production line for providing insulation upon conductor to produce the insulated conductor 26 as shown in FIG. 3. The insulated conductor moves downstream from the extruder head and passes through a means for monitoring any degree of eccentricity between the conductor and its insulation layer. This means comprises a device 76 which is positioned to continually measure the thickness of the insulation at various positions around the conductor or otherwise to gauge the eccentricity of the conductor within the insulation. This device may be of a conventional laser beam type or beta ray type and is capable of sending signals relating to the insulation thickness at particular positions, or relating to the eccentricity as the case may be, to a computer control 78 of the monitoring means. In the computer control, the values of the signals received from the device 76 are analyzed, i.e. they are compared with a preset value which corresponds to the desired concentricity of the conductor inside the insulation. If the received signal values differ from the preset value, then the computer issues a control signal to an appropriate or both of the motors 68 and 74. The motors are responsive to the control signals to operate the gear arrangements controlling the positions of the tubes 42 and 54. The motors are rotated in the appropriate direction to cause rotation of the tubes 42 and 54 so as to universally move the insert 22 whereby the outlet 24 is moved towards a position relative to the die orifice 18 that corresponds to a concentric position of the conductor within the insulation. Successive monitorings of the eccentricity of conductor and insulation determine whether outlet 24 is in its required position and further adjustments are made as necessary.

As has been discussed above, movement of the outlet orifice 24 may be extremely small and will be sufficient to provide concentricity of the conductor within an insulation layer which may be only in the region of 7 mils thick.

What is claimed is:

1. An apparatus for forming an insulation layer around an electrical conductor comprising an extruder head having a die orifice, a die insert mounted for universal movement within the head, the insert having an outlet orifice for passage of the conductor along a passline towards the die orifice, and position control means to controllably position the insert within the head, said position control means comprising a first rotatable mounting eccentrically holding the die insert, said first rotatable mounting being rotatable about the die insert, and a second rotatable mounting radially outside of and eccentrically holding the first rotatable mounting, a driving means for rotatably turning each mounting, and means for monitoring and analyzing degree of eccentricity of the conductor and the insulation layer downstream from the extruder head and for issuing control signals dependent upon the degree of eccentricity of said conductor, the driving means responsive to the control signals to selectively rotate the mountings and universally move the insert in an appropriate direction to lessen the degree of eccentricity of the conductor and the insulation layer.

2. Apparatus according to claim 1 wherein the first and second mountings, respectively comprise first and second tubes each having an outer surface and a bore which is eccentric relative to said outer surface, the second tube surrounding and rotatably carrying the first tube and the second tube rotatably mounted in the extruder head.

3. Apparatus according to claim 2 wherein an annular support element is concentrically carried upon the die insert, the first tube rotatable around the support element and the support element having an annular inner projecting rib formed with a peak which provides an annular line contact with the die insert.

4. Apparatus according to claim 3 wherein each driving means comprises a worm and wheel gear arrangement, the wheel carried by the associated tube and engaged by the worm, and a motor drivably connected to the worm, operation of the motor dependent upon the control signals.

5. Apparatus according to claim 1 wherein the die insert is mounted for universal movement at a first position spaced from the outlet orifice and the position control means is operatively connected to the die insert at a second axial position spaced further from said first axial position than the outlet orifice whereby any degree of controlled movement of the die insert at said second axial position is translated into a smaller degree of movement of the outlet orifice.

* * * * *